(12) United States Patent
Bartels

(10) Patent No.: US 10,242,246 B2
(45) Date of Patent: Mar. 26, 2019

(54) DECODER AND ENCODER FOR A DIGITAL FINGERPRINT CODE

(71) Applicant: AGFA NV, Mortsel (BE)

(72) Inventor: Rudolf Bartels, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/794,063

(22) Filed: Oct. 26, 2017

(65) Prior Publication Data

US 2018/0046845 A1 Feb. 15, 2018

Related U.S. Application Data

(63) Continuation of application No. 15/125,229, filed as application No. PCT/EP2015/055536 on Mar. 17, 2015, now Pat. No. 9,830,500.

(30) Foreign Application Priority Data

Mar. 17, 2014 (EP) ..................................... 14160243

(51) Int. Cl.
| | |
|---|---|
| *G06K 9/00* | (2006.01) |
| *G06K 7/10* | (2006.01) |
| *G06K 19/06* | (2006.01) |
| *H04N 19/136* | (2014.01) |
| *H04N 19/44* | (2014.01) |
| *G06K 9/46* | (2006.01) |
| *G06K 9/52* | (2006.01) |

(52) U.S. Cl.
CPC ........... *G06K 9/00087* (2013.01); *G06K 7/10* (2013.01); *G06K 9/00013* (2013.01); *G06K 9/4652* (2013.01); *G06K 9/52* (2013.01); *G06K 19/06009* (2013.01); *H04N 19/136* (2014.11); *H04N 19/44* (2014.11); *G06K 19/0614* (2013.01)

(58) Field of Classification Search
CPC ............... G06K 19/06009; G06K 7/10; G06K 9/00013; G06K 9/00087; G06K 9/4652; G06K 9/52; G06K 19/0614; H04N 19/136; H04N 19/44
See application file for complete search history.

(56) References Cited

U.S. PATENT DOCUMENTS

| | | | | |
|---|---|---|---|---|
| 5,506,914 A | * | 4/1996 | Baker | .................... G01B 11/24 348/125 |
| 6,345,104 B1 | * | 2/2002 | Rhoads | .............. G06K 9/00442 283/74 |
| 2002/0156866 A1 | * | 10/2002 | Schneider | ......... G06F 17/30876 709/218 |
| 2005/0161118 A1 | * | 7/2005 | Carman | .................... B07C 5/14 144/403 |
| 2006/0114463 A1 | * | 6/2006 | Detinkin | ................ G01N 21/49 356/431 |

(Continued)

OTHER PUBLICATIONS

Bartels, "A Decoder and Encoder for a Digital Fingerprint Code", U.S. Appl. No. 15/125,229, filed Sep. 12, 2016.

*Primary Examiner* — Edward Park
(74) *Attorney, Agent, or Firm* — Keating and Bennett, LLP

(57) ABSTRACT

A method to encode and decode a digital fingerprint code by an identification encoder and an identification decoder wherein the digital fingerprint code includes a plurality of N-bit data embedded on a set of curves by changed thicknesses in the curves.

7 Claims, 6 Drawing Sheets

(56) References Cited

U.S. PATENT DOCUMENTS

| | | | |
|---|---|---|---|
| 2006/0271433 A1* | 11/2006 | Hughes | A63F 3/0665 705/14.14 |
| 2008/0023546 A1* | 1/2008 | Myodo | G06K 7/14 235/462.04 |
| 2012/0175866 A1* | 7/2012 | Kisters | G07C 11/00 283/67 |
| 2013/0038963 A1* | 2/2013 | Nespeca | G11B 15/6835 360/92.1 |
| 2016/0193857 A1* | 7/2016 | De Mondt | B41M 5/0011 52/311.1 |

* cited by examiner

DECODER AND ENCODER FOR A DIGITAL FINGERPRINT CODE

CROSS-REFERENCE TO RELATED APPLICATIONS

This application is a 371 National Stage Application of PCT/EP2015/055536, filed Mar. 17, 2015. This application claims the benefit of European Application No. 14160243.3, filed Mar. 17, 2014, which is incorporated by reference herein in its entirety.

BACKGROUND OF THE INVENTION

1. Field of the Invention

The invention pertains generally in the technical field of encoding and decoding optical-machine-readable reproductions of information, also called identification codes, which are readable by a digital imaging device, such as digital camera in a mobile phone.

2. Description of the Related Art

Different types of identification codes are well-known, especially in the graphical industry. One of the oldest types of optical machine-readable reproductions is the one-dimensional barcode. These one-dimensional barcodes are representing the data by varying the widths and spacing's of parallel lines. Barcodes originally were scanned by special optical scanners, called barcode readers. Later, digital imaging devices and interpretive software became available on devices such as portable mobiles.

The one-dimensional barcode is nowadays evolved to two-dimensional barcodes, also called matrix barcodes such as the Quick Response Code or QR code. The QR code was first designed for the automotive industry in Japan. A QR code on an item is scanned by a digital imaging device to read the content about the item which it is attached.

The ability of portable mobiles to scan QR codes makes this type of two-dimensional barcodes popular. For example a QR code, embedded in document markup language documents, such as HTML, contains a hyperlink to a web page. Another example is a QR codes, printed on a package, such as pharmaceutical package comprising a medicine, directs the operator of a mobile phone, after the QR code is scanned, to the specifications of the medicine on a web page.

The current available types of identification codes, such as QR code, are conspicuous in a reproduction of a document which makes it easier to interpret a content embedded in the optical machine-readable reproduction.

Also an identification code takes some place in a layout of the document which may be used for other content. Especially in small sized reproductions such as packages of medicines.

SUMMARY OF THE INVENTION

In order to overcome the problems described above, preferred embodiments of the present invention have been realised with a digital fingerprint code (DF code) which is encoded in a document as defined below and decoded by an digital imaging device as defined below.

The preferred embodiments of the invention give the ability to add secret or/and invisible-for-the-human-eye content at a certain viewing distance to a document by an identification code and it gives the ability to create more space in the document space of a document to add more content in a document. The preferred embodiments of the invention comprise also a method to decode the digital fingerprint code easily by a digital imaging device to read the content embedded in a digital fingerprint code (DF code).

The digital fingerprint code comprises a set of curves wherein a content (CNT) is embedded by a plurality of N-bit data;

wherein each possible value of N-bit data has a thickness ($T_{N,i}$) and length ($L_{N,i}$); and wherein the plurality of N-bit data comprises a first N-bit data ($N_1$), subsequent by a different second N-bit data ($N_2$) on a curve of the set of curves; and wherein the thickness ($T_{N,i,1}$) of the value ($v_{N,1}$) of the first N-bit data ($N_1$) on the curve is different from the thickness ($T_{N,i,2}$) of the value ($v_{N,2}$) of the second N-bit data ($N_2$) and/or wherein the length ($L_{N,i,1}$) of the value ($v_{N,1}$) of the first N-bit data ($N_1$) on the curve is different from the length ($L_{N,i,2}$) of the value ($v_{N,2}$) of the second N-bit data ($N_2$);

wherein the digital fingerprint code is decoded by an identification decoding method which comprises the following steps:

capturing a digital fingerprint code (DF code) by a digital imaging device; and determining an image captured curve in the image captured digital fingerprint code; and determining from a set of two-dimensional points ($p_k$) on the image captured curve a set of thicknesses ($t_k$) of the image captured curve; and determining the plurality of N-bit data from the set of thicknesses ($t_k$) and the location of the set of two-dimensional points ($p_k$) on the image captured curve; and/or wherein the digital fingerprint code is encoded by an identification encoding method which comprises the following steps:

determining a document; and determining a curve in the document; and determining for an N-bit data of the plurality of N-bit data a thickness ($T_{N,i}$) and a length ($L_{N,i}$); and determining a first segment on the determined curve with determined length ($L_{N,i}$); and changing the thickness of a part in the first segment to the determined thickness ($T_{N,i}$); and generating from the document with the generated digital fingerprint code a new document.

A curve is a two-dimensional continuous line which doesn't have to be straight. A curve has a start point and an end point. The length of the curve is preferably finite and bounded. And in a preferred embodiment a curve is a non-self-intersecting-curve. A curve in a preferred embodiment continues, uninterrupted and bounded. In a preferred embodiment the set of curves comprises one curve.

The thickness on a curve may be any shape such as triangular, quadratic, rectangular, heptagonal, pentagonal, oval, rhombus, octagonal, or elliptical shaped. The determining the thickness of a curve or a line is a well-known method wherein the thickness of the curve or line in the perpendicular direction of the curve or line is measured.

In the identification decoding method a one-dimensional signal is determined from the plurality of N-bit data out the set of thicknesses and the location of the set of two-dimensional points on the imaged captured curve, wherein the one-dimensional signal is varied with a determined thickness in its determined location (FIG. 1, FIG. 2, FIG. 3). So in a preferred embodiment the step of determining the plurality of N-bit data from the set of thicknesses ($t_k$) and the location of the set of two-dimensional points ($p_k$) on the image captured curve comprises the step of generation a one-dimensional signal based on the determined set of locations and corresponding thicknesses. The one-dimensional signal is than translated to the plurality of N-bit data, which is embedded in the digital fingerprint code. This preferred embodiment may comprise also a discretization step and/or quantization step to determine the plurality of N-bit data, embedded in the digital fingerprint code.

In a preferred embodiment the identification encoding method may comprise the following steps:
  determining the following N-bit data of the N-bit data a thickness ($T_{N,i}$) and a length ($L_{N,i}$); and
  determining a second segment on the determined curve, following the first segment, wherein the second segment has the determined length of the following N-bit data; and
  changing the thickness of a part in the second segment to the determined thickness of the following N-bit data.

In a more preferred embodiment a third segment is determined between the first and second segment and third segment is determined with a fixed length and/or with a fixed thickness. Preferably the fixed thickness is different from the thicknesses ($T_{N,i}$) of all values of N-bit data. This makes the distinctions between following N-bit data while decoding easier.

The identification code of a preferred embodiment is called a digital fingerprint code (DF code).

In a preferred embodiment each possible value of N-bit data has a color ($C_{N,i}$); and wherein the color ($C_{N,i,1}$) of the value ($v_{N,1}$) of the first N-bit data ($N_1$) on the curve is different from the color ($C_{N,i,2}$) of the value ($v_{N,2}$) of the second N-bit data ($N_2$); and
wherein the identification decoding method comprises the step of:
  determining in the set of two-dimensional points ($p_k$) a set of colors ($c_k$); and
  determining the plurality of N-bit data from the set of thicknesses ($t_k$), the location of the set of two-dimensional points ($p_k$) on the path and the set of colors ($c_k$); and/or
the identification encoding method comprises the following steps:
  determining for the N-bit data the color ($C_{N,i}$); and
  changing the color of the segment to the determined color ($C_{N,i}$).

By using colors in the digital fingerprint code (DF code) has a positive impact on the storage-amount on a curve, surely when the true output resolution of the content output device is small.

The digital fingerprint code (DF code) is preferably in the identification decoding method, image captured by a digital imaging device comprised in a mobile device; and wherein the mobile device is selected from a mobile computer, such as a computer tablet or mobile phone, such as a smart phone.

In a preferred embodiment the digital fingerprint code (DF code) is used to read the content about the item on which the digital fingerprint code is attached.

In another preferred embodiment the digital fingerprint code (DF code) is used to track-and-trace the item on which the digital fingerprint code is attached. Track-and-trace or tracking-and-tracing, concerns a process of determining the current and past locations (and other information) of a unique item or property.

In another preferred embodiment the digital fingerprint code (DF code) is used to add secure content for anti-counterfeiting purposes on the item on which the digital fingerprint code is attached. The anti-counterfeiting purposes may be enhanced wherein the item is a container comprising a liquid and wherein the digital fingerprint code (DF code) is reproduced with more than 50% of the compounds of the liquid by a printer device. More preferably the item is a container comprising an inkjet ink and wherein the digital fingerprint code (DF code) is reproduced with more than 50% of the inkjet ink by an inkjet printer. By chemical analysis the printed liquid of the reproduced digital fingerprint code may be compared with the liquid inside the container, such as a bottle.

Figure 1:
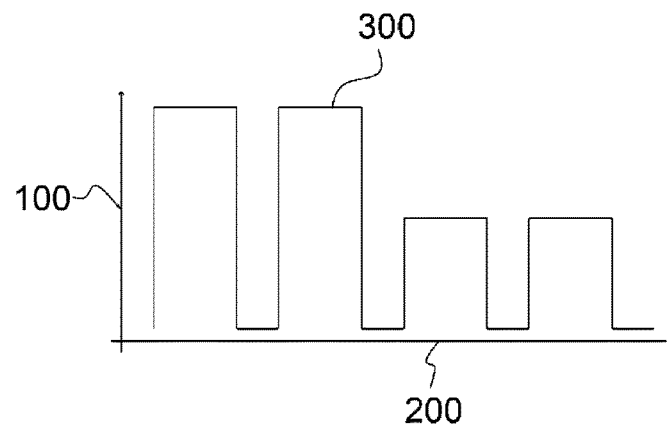
FIG. 1 (FIG. 1) illustrates a content by a plurality of binary data (300), which is a N-bit data wherein N is equal to 1 in a graph. On the vertical axis (100) the thickness ($T_{N,i}$) of a N-bit data can be read, for example in micrometers and on the horizontal axis (200) the location on a curve from the set of curves can be read, for example in micrometers.

The graph in FIG. 1 represents '1100' as a plurality of binary data. The thickness for value 1 ($T_{N,1}$) and the thickness for value 0 ($T_{N,0}$) of a bit is different and the length for value 1 ($L_{N,1}$) and the thickness for value 0 ($L_{N,0}$) of a bit is equal. Between two sequent binary dates a fixed thickness and fixed length is represented.

Figure 2:
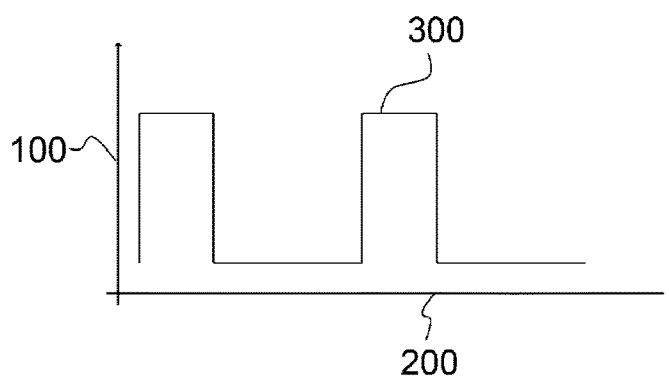

FIG. 2 (FIG. 2) illustrates a content by a plurality of binary data, which is a N-bit data wherein N is equal to 1 in a graph. On the vertical axis (100) the thickness ($T_{N,i}$) of a N-bit data can be read, for example in micrometers and on the horizontal axis (200) the location on a curve from the set of curves can be read, for example in micrometers.

The graph in FIG. 2 (FIG. 2) represents '100100' as a plurality of binary data (300). The thickness for value 1 ($T_{N,1}$) and the thickness for value 0 ($T_{N,0}$) of a bit is different and the length for value 1 ($L_{N,1}$) and the thickness for value 0 ($L_{N,0}$) of a bit is equal. Between two sequent binary dates there is no fixed length represented. The plurality of binary data '100100' in this graph is an encoded plurality of binary data from another plurality of binary data '1100' wherein the value 1 in the encoded plurality of binary data represents a change in a bit of the another plurality of binary data and wherein the amount of zeros in the encoded plurality of binary data represents how much times the changed bit of the another plurality of binary data is represented. The encoded plurality of binary data is a kind of run-length-encoded (RLE) plurality of binary data.

Figure 3:
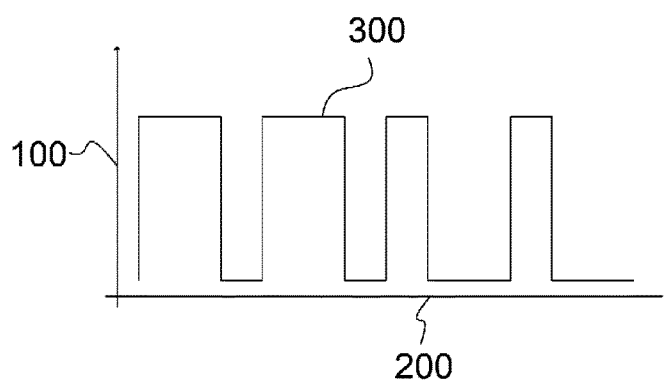

FIG. 3 (FIG. 3) illustrates another representation of a plurality of binary data (300), which is a N-bit data wherein N is equal to 1 in a graph. On the vertical axis (100) the thickness ($T_{N,i}$) of a N-bit data can be read, for example in micrometers and on the horizontal axis (200) the location on a curve from the set of curves can be read, for example in micrometers.

The graph in FIG. 3 (FIG. 3) illustrates '1100' as a plurality of binary data. The thickness for value 1 ($T_{N,1}$) and the thickness for value 0 ($T_{N,0}$) of a bit is different and the length for value 1 ($L_{N,1}$) and the thickness for value 0 ($L_{N,0}$) of a bit is different. Between two sequent binary data's a fixed thickness and fixed length is represented.

Figure 4:
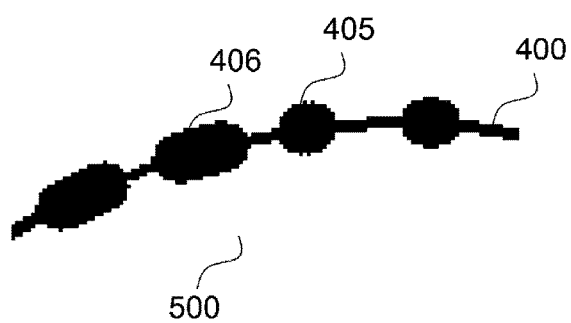

FIG. 4 (FIG. 4) illustrates a curve (400) in the digital fingerprint code (500) of wherein a plurality of binary data '1100' is represented in the way it is defined in FIG. 3 (FIG. 3). The thickness for value 1 (406, $T_{N,1}$) and the thickness for value 0 (405, $T_{N,0}$) of a bit is different and the length for value 1 (406, $L_{N,1}$) and the length for value 0 (405, $L_{N,0}$) of a bit is different. Between two sequent binary data's a fixed length is represented.

Figure 5:
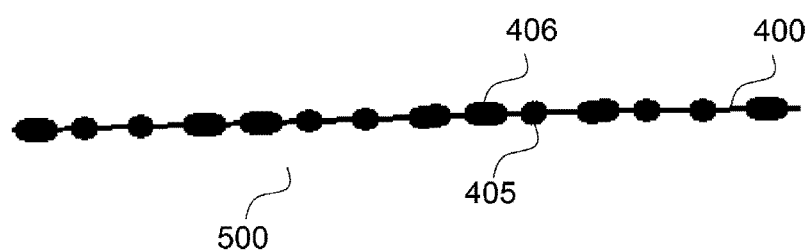

FIG. 5 (FIG. 5) illustrates a curve (400) in the digital fingerprint code (500) of wherein the thickness for value 1 (406, $T_{N,1}$) and the thickness for value 0 (405, $T_{N,0}$) of a bit is different and the length for value 1 (406, $L_{N,1}$) and the thickness for value 0 (405, $L_{N,0}$) of a bit is different. Between two sequent binary data's a fixed length is represented. The plurality of binary data represents character 'A' (capital a) which is in ASCII character 65, and represented as a byte '01000001'. By using the Hamming method as error-correcting code method the plurality of binary data embedded on the curve (400) becomes '10011001101001'.

Figure 6:
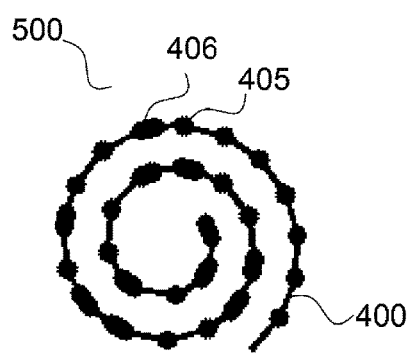

FIG. 6 (FIG. 6) illustrates a curve (400) in the digital fingerprint code (500) of wherein the thickness for value 1 (406, $T_{N,1}$) and the thickness for value 0 (405, $T_{N,0}$) of a bit is different and the length for value 1 (406, $L_{N,1}$) and the thickness for value 0 (405, $L_{N,0}$) of a bit is different. Between two sequent binary data's a fixed length is represented. The plurality of binary data represents character 'A' (capital a) which is in ASCII character 65, and represented as a byte '01000001'. By using the Hamming method (7,4) as error-correcting code and adding a header sequence '0001' and tail sequence '0000', the plurality of binary data embedded on the curve (400) becomes '1101001 1001100 1101001 0000000'. The curve (400) in the digital fingerprint code (500) is a spiral.

Figure 7:
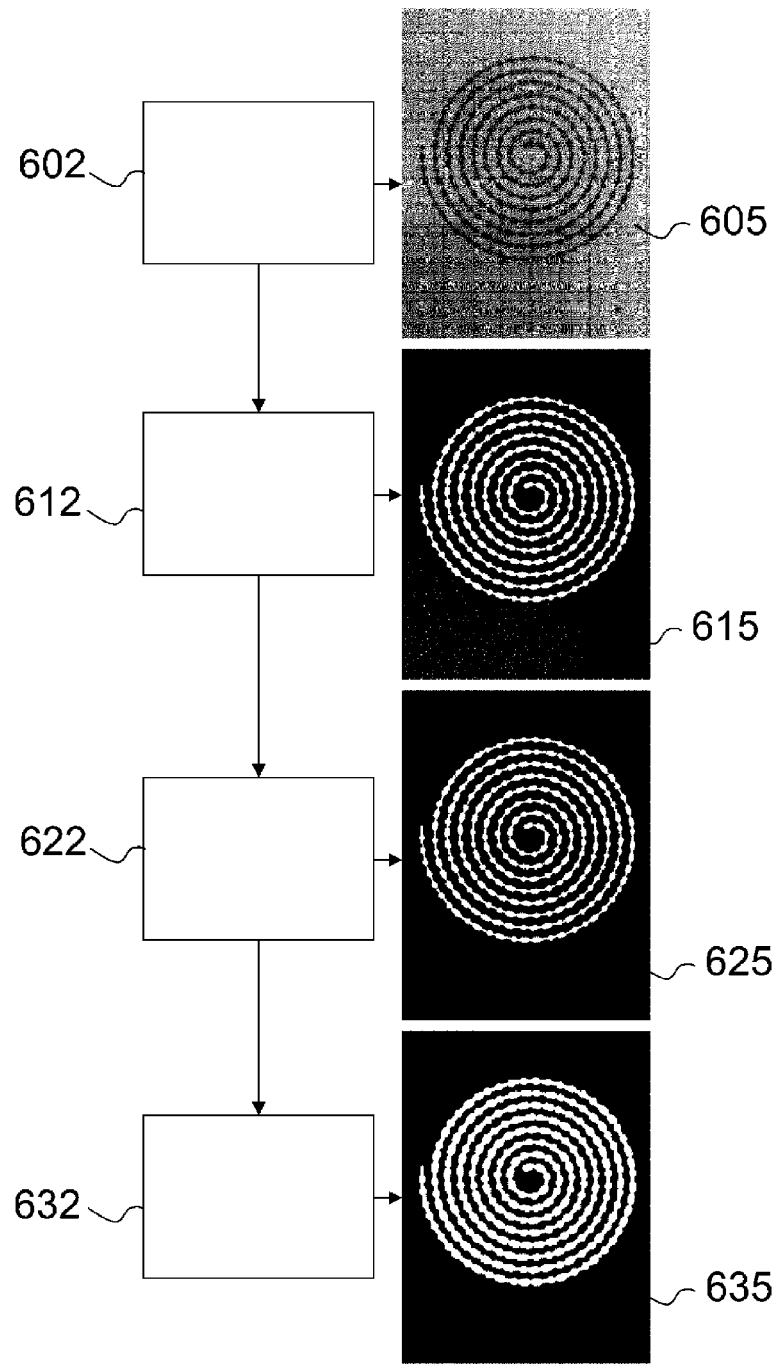

FIG. 7 (FIG. 7) illustrates a part of the identification decoding method comprising the processing of an example to decode digital fingerprint code with embedded content on a spiral. In a first step the digital fingerprint code is captured by a digital imaging device (602) which results for the example in image captured digital fingerprint code (605). By thresholding the captured digital fingerprint code (612), as second step, results for the example in a thresholded image captured digital fingerprint code (615). In the third step a blurring method is performed (622) which results for the example in a blurred image captured digital fingerprint code (625). The fourth step is performing a dilatation (632) to result for the example to a dilatational blurred thresholded image captured digital fingerprint code (635). After this step the image captured curve in the image captured digital fingerprint code is determined.

Figure 8:
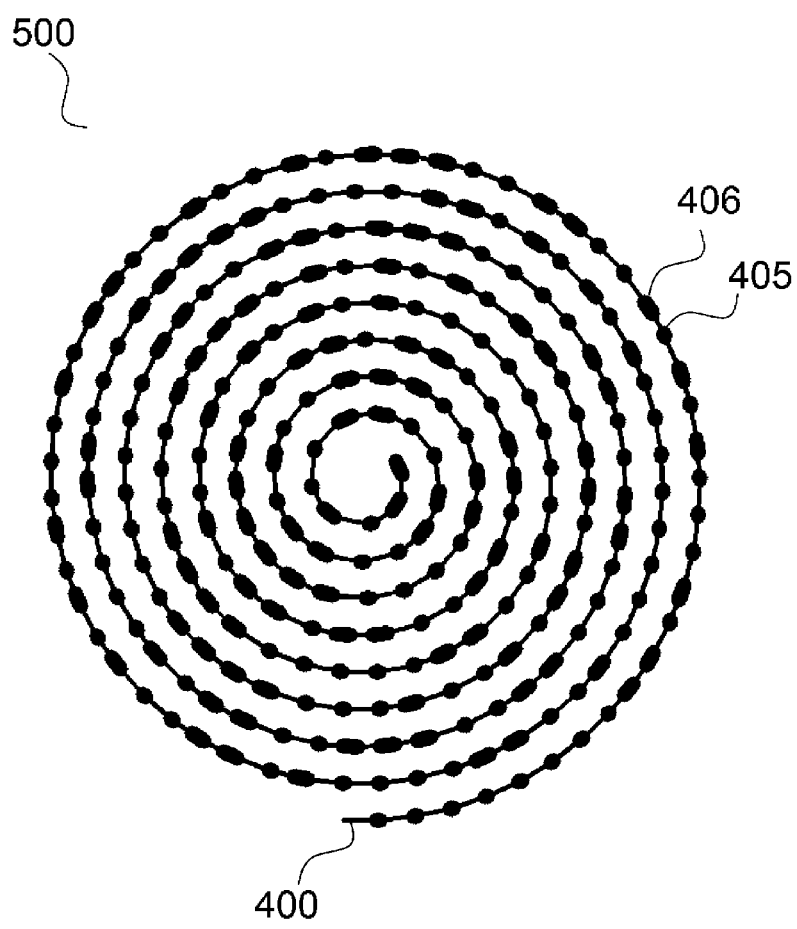

FIG. 8 (FIG. 8) illustrates a digital fingerprint code (DF code) (500) with one spiral as curve (400) wherein the thickness for value 1 (406, $T_{N,1}$) and the thickness for value 0 (405, $T_{N,0}$) of a bit is different and the length for value 1 (406, $L_{N,1}$) and the thickness for value 0 (405, $L_{N,0}$) of a bit is different. Between two sequent binary data's a fixed length is represented.

Figure 9:
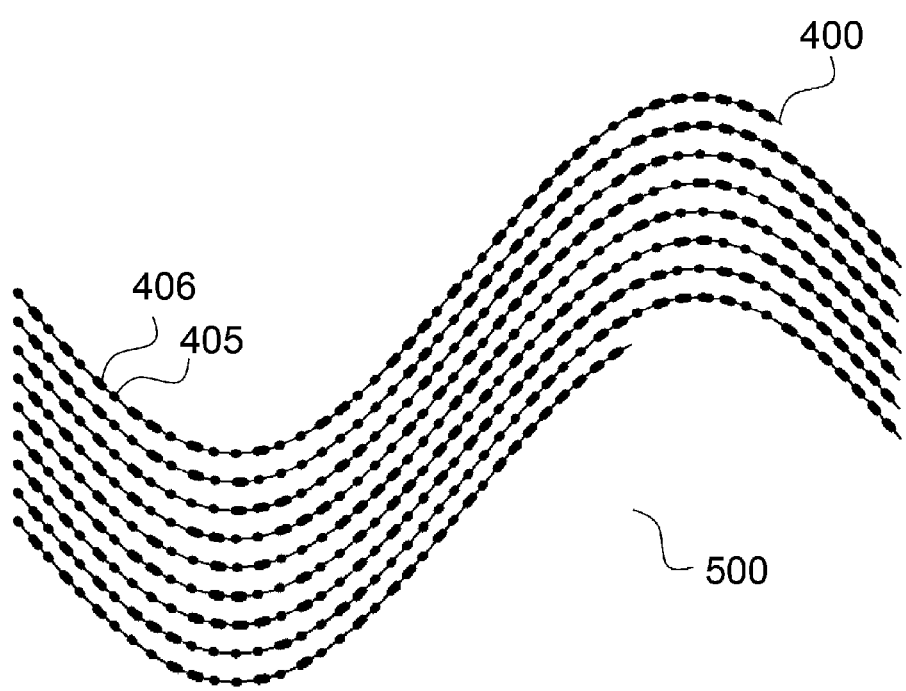

FIG. 9 (FIG. 9) illustrates a digital fingerprint code (DF code) (500) with a plurality of curves (400) wherein the thickness for value 1 (406, $T_{N,1}$) and the thickness for value (405, $T_{N,0}$) of a bit is different and the length for value 1 (406, $L_{N,1}$) and the thickness for value 0 (405, $L_{N,0}$) of a bit is different. Between two sequent binary data's a fixed length is represented.

Figure 10:
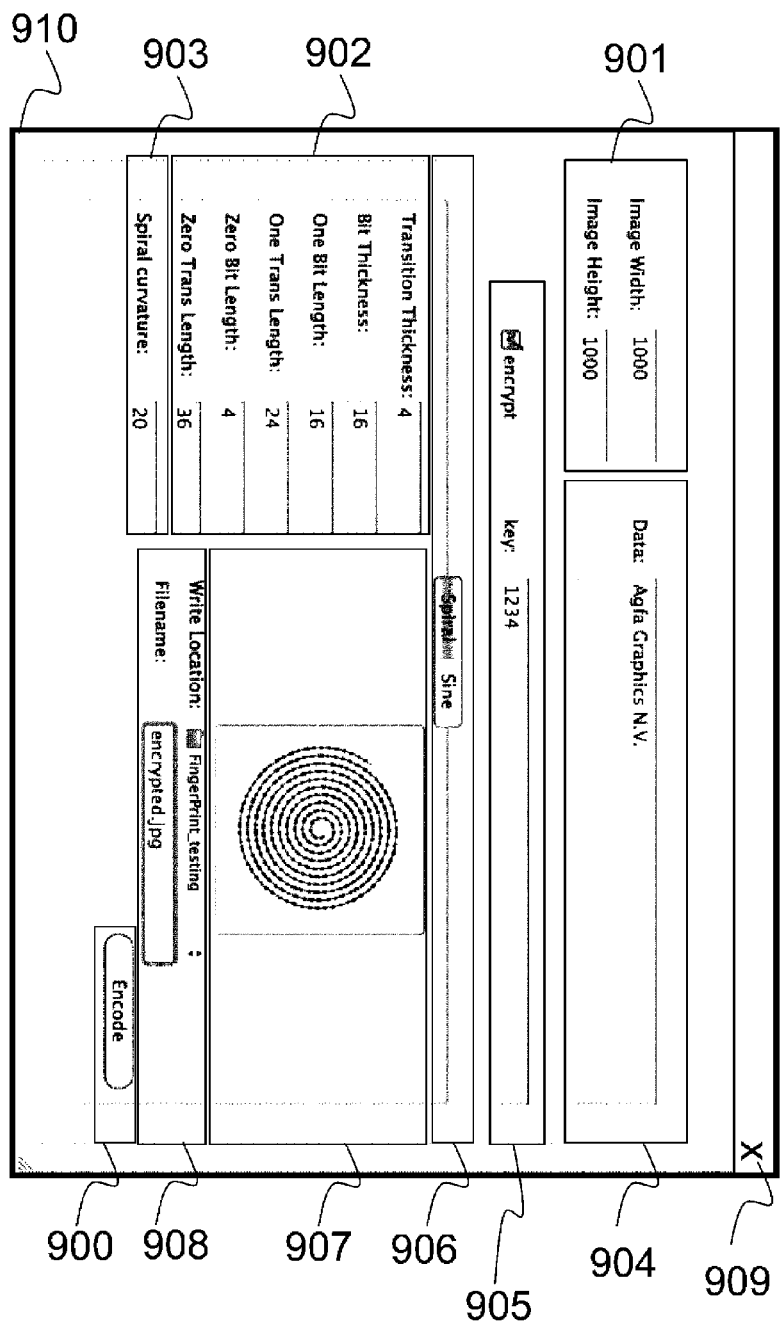

FIG. 10 illustrates an user interface (910) of a preferred identification encoder comprising a plurality of user interface objects (900, 901, 902, 903, 904, 905, 906, 907, 908, 909). The user interface object (909) is the title bar of a window which comprises a closing button ('X') to close the user interface (910). The user interface 901 defines two input fields to define the width and the height, both in pixels, of a digital fingerprint code (DF code). The user interface object (902) comprises a plurality of input fields such as the thickness and length of value 1 ('one bit') and the thickness and length of value 0 ('zero bit') and the length between two sequent binary data's. The user interface object (903) comprises an input field for the curvature of the spiral as curve in the digital fingerprint code. The user interface object (904) comprises an input field for the content that has to be embedded in the digital fingerprint code (DF code). The user interface object (905) comprises a check box if the content has to be encrypted with a key which has to be filled in an input field. The user interface object (906) defines the shape of the curve: spiral-shaped or sinus-shaped ('sine'). The user interface object (907) comprises an image which is a representation of the generated digital fingerprint code (DF code). The user interface object (908) comprises the name ('encrypted.jpg') and the place of the digital fingerprint code (DF code) on a hard disk drive (HDD) and the user interface object (909) comprises a button to start the generation of a digital fingerprint code (DF code).

DETAILED DESCRIPTION OF THE PREFERRED EMBODIMENTS

Definitions

Document

A document comprises content, preferably graphically arranged, in a document space. A document is digital stored in a storage unit such as hard disk drive (HDD) connected to a hardware configuration such as a computer, memory in a central processing unit (CPU) comprised in a hardware configuration and the like. The graphically arrangement, also called lay-outing, of the content in the document space is also called the lay-out of the document.

A document may comprise a static layout or preferably a dynamic layout. Static layout design may involve more graphic design and visual art skills; whereas dynamic layout design may involve more interactive design and content management skills to thoroughly anticipate content variation.

The document space of the document may be a two-dimensional space with two fixed dimensions, more preferably the document space is a page or multiple pages and most preferably a web-page.

The document space may be a two-dimensional space with one fixed and one endless dimension such as in the rendering method of multiple print jobs disclosed in EP 1933257 (Agfa Graphics NV).

The content objects in a document may be defined in one or more colors by one or more content objects such as photographic images, business graphs, text, labels and the like, which are also called objects of the document.

A raster graphic is also known as a bitmap, contone or a bitmapped graphic and represent a two-dimensional discrete image P(x,y).

A vector graphic, also known as object-oriented graphic, uses geometrical primitives such as points, lines, curves, and shapes or polygon(s), which are all based on mathematical expressions, to represent an image.

A content object in a document may be defined in a vector graphics format, also called line-work format, such as Scale Vector Graphics (SVG) or AutoCad Drawing Exchange Format (DXF) and more preferably defined in a page description language (PDL) such as Printer Command Language (PCL): developed by Hewlett Packard, Postscript (PS): developed by Adobe Systems or Portable Document Format (PDF): developed by Adobe Systems. Preferably the lay-out of the document is created in a desktop publishing (DTP) software package such as Adobe InDesign™, Adobe PageMaker™, QuarkXpress™ or Scribus (http://scribus.net/canvas/Scribus).

The content objects in a document may be defined in a document markup language, also called mark-up language, such as IBM's Generalized Markup Language (GML) or Standard Generalized Markup Language (ISO 8879:1986 SGML), more preferably defined in HyperText Markup Language (HTML) and most preferably defined in HTML5, the fifth revision of the HTML standard (created in 1990 and standardized as HTML 4 as of 1997) and, as of December 2012, is a candidate recommendation of the World Wide Web Consortium (W3C). Such a document is sometimes called a web-document.

The layout of a web-document may be created in a web-design software package by Cascading Style Sheets (CSS), a style sheet language used for describing the content of the document in the document markup language and more preferably the layout of a web-document is created in a web-design software package by Cascading Style Sheets 3 (CSS3), published from the CSS Working Group of the World Wide Web Consortium (W3C).

The content objects in a document may be defined in a Variable Data Printing format (VDP) such as Intelligent Printer Data Streams (IPDS): found in the AS400 and IBM mainframe environments and used with dot matrix printers, Variable data Intelligent PostScript Printware (VIPP): A proprietary VDP language from Xerox, traditionally used in the transactional black-and-white printing market, Variable Print Specification (VPS): a VDP language from Creo, Advanced Function Presentation (AFP) format defined by AFP Consortium (AFPC), more preferably defined in Personalized Print Markup Language (PPML), an XML-based industry standard printer language for variable data printing defined by Printing On Demand Initiative (PODi) and most preferably defined in PDF/VT published in 2010 as ISO 16612-2.

In a preferred embodiment a document is defined in a document format selected from vector graphic formats, document markup language or variable data printing format, more preferably selected from page description formats, variable data printing format or document markup language and most preferably selected from Portable Document Format (PDF) or the fifth revision of HyperText Markup Language (HTML5).

Raster Image Processing Method

A raster image processing method is an image manipulation method that interpret a document to render the interpretation of the document to:
- a raster graphic which is suitable for viewing on a display device such as a television, computer monitors or the display device of a tablet computer or mobile phone; or
- a raster graphic which is suitable for projecting the raster graphic by a projector device such as a video-projector, LCD projector, DLP projector LED projector or laser diode projector; or
- a raster graphic which is suitable for printing on a printer device such as a toner-based printer, an inkjet printer or offset press.

A content output device is a device which reproduces the content data of a document in its document space such as a display device, projector device or printer device.

The digital fingerprint code may be reproduced by a raster image processing method on a content output device. Preferably the digital fingerprint code is reproduced by a projecting method on a projector device, more preferably by a displaying method on a display device and most preferably by a printing method on a printer device.

A raster image method is a computer implemented method that is performed on a hardware (HW) configuration, such as a computer, tablet computer and the like, comprising a central processing unit (CPU), a memory, a storage device such as a hard disk drive (HDD), a communication interface (IF) device that sends and receives data to and from other hardware configurations via a network. The hardware configuration may comprise a user interface (UI) device that may comprise a display device.

The apparatus that performs a raster image processing method is called a raster image processor (RIP). A raster image processor (RIP) may comprise a prepress workflow system such as Prinect Workflow System™ from Heidelberger Druckmaschinen AG or Apogee Prepress™ from Agfa Graphics NV or the prepress workflow system disclosed in US20130194598 (FUJI XEROX).

In a preferred embodiment a raster image processor comprises one or more GPU's for faster rendering a document to a content output device.

Identification Encoder

An identification encoder is a device that generates digital fingerprint codes in a document, for example to identify an item whereon a digital fingerprint code (DF code) in a reproduced document is attached, for example on a label. The digital fingerprint code is readable by a digital imaging device, for example to identify the item.

An identification encoder is also called an identification code generator or identification code writer.

An identification encoding method, also called identification code writing method or identification code generating method, is a computer implemented method that is performed on a hardware (HW) configuration, such as a computer, tablet computer and the like, comprising a central processing unit (CPU), a memory, a storage device such as a hard disk drive (HDD), a communication interface (IF) device that sends and receives data to and from other hardware configurations via a network. The hardware configuration may comprise a user interface (UI) device that may comprise a display device.

In a preferred embodiment the identification encoder comprises one or more GPU's for faster writing of a digital fingerprint code in a document.

In a preferred embodiment, the identification encoder comprises a raster image processor to represent the new document of a preferred embodiment on a content output device such as an inkjet printer, and in a more preferred embodiment, a content output device, such as an inkjet printer, comprises the identification encoder.

An identification encoder may also be comprised in a desktop publishing (DTP) software package such as Adobe InDesign™, Adobe PageMaker™, QuarkXpress™ or Scribus (http://scribus.net/canvas/Scribus) wherein a digital fingerprint code (DF code) may written in a document that is layouted in the desktop publishing (DTP) software package.

The identification encoding method for a digital fingerprint code comprises in a preferred embodiment the following steps:
- determining a document; and
- determining a curve in the document; and
- determining for an N-bit data of the plurality of N-bit data a thickness ($T_{N,i}$) and a length ($L_{N,i}$); and
- determining a first segment on the determined curve with determined length ($L_{N,i}$); and
- changing the thickness of the first segment to the determined thickness ($T_{N,i}$); and
- generating from the document with the written digital fingerprint code a new document.

In a preferred embodiment the new document with the digital fingerprint code is reproduced by a content output device, such as an inkjet printer.

The determined curve in a document may for example a segmented outline of a font from text content in the document. Or it may for example be the edge of house in an image as content object of the document.

In a preferred embodiment in the identification encoding method the part of the first segment is the whole first segment.

Changing the thickness of the first segment in the identification encoding method may be at one side of the curve but preferably at both sides of the curve.

The determined curve in the determined document is preferably determined by the operator of the identification encoder but more preferably determined automatically by interpreting the content objects in the document. If a content object is a vector graphic, the interpreting of the content object is easily done to determine automatically a curve because a vector graphic is defined by curves such as Bezier-curves. If the content object is a raster graphic, the interpreting of the content object may be done by image manipulation methods such as edge-detection methods.

In a preferred embodiment the changing of the thickness of the segment comprises changing the color of the thickness in the color of the determined curve.

The changing of the thickness in a segment of a vector-graphic-defined curve is easily because the segment is also defined as vector graphic. If the segment is of a raster-graphic-defined-curve the thickness of the segment may be changed by image manipulation methods such as bi-cubic scaling.

An overview of image manipulation methods that may be comprised in the identification encoder is disclosed in Part 3 "Discrete two-dimensional processing" [Page 145-244] and Part 4 "Image improvement" [Page 245-418] of PRATT, William K. Digital Image Processing: PIKS Scientific Inside. 4th edition. John Wiley.

The identification encoder may comprise a data compressor to compress the plurality of N-bits such as run-length encoding and/or may comprise a data security system wherein the plurality of N-bits is secured encoded by a security key for example a password.

The shape of thickening in the curve of a digital fingerprint code is in a preferred embodiment triangular, quadratic, rectangular, heptagonal, pentagonal, oval, rhombus, octagonal, or elliptical shaped.

In a preferred embodiment the document is a wood pattern, as an decorative pattern and a curve in the set of curves is a nerve or a wood grain imperfection in the wood pattern:

The identification encoder of a digital fingerprint code (DF-code) comprises in a preferred embodiment the following steps:
- determining a decorative pattern comprising a wood pattern; and
- determining a nerve or wood grain imperfection in the wood pattern; and
- determining for an N-bit data of the plurality of N-bit data a thickness ($T_{N,i}$) and a length ($L_{N,i}$); and
- determining a first segment on the determined nerve or determined wood grain imperfections with determined length ($L_{N,i}$); and
- changing the thickness of the segment to the determined thickness ($T_{N,i}$); and
- generating from the wood pattern with the digital fingerprint code a new wood pattern.

The thickenings on the nerve or the wood-grain imperfection from the digital fingerprint code (DF code) preferably have the same color as the nerve or the wood-grain imperfection.

The determination of a nerve or wood-grain imperfection in a wood pattern may be performed by image analysis method which may comprises fast Fourier transformations (FFT), histogram calculations and filtering methods.

In a preferred embodiment the digital fingerprint code (DF code) is used to read the content about a decorative workpiece comprising a wood pattern, as decorative pattern, on which the digital fingerprint code is attached.

In another preferred embodiment the digital fingerprint code (DF code) is used to track-and-trace a decorative workpiece comprising a wood pattern, as decorative pattern, on which the digital fingerprint code is attached.

In a preferred embodiment the new wood pattern with the digital fingerprint code is reproduced by an inkjet printer or gravure printer and in a more preferred embodiment the identification encoder is comprised in the manufacturing of a decorative workpiece wherein the new wood pattern with the digital fingerprint code, embedded in the decorative workpiece, is reproduced by an inkjet printer or gravure printer.

The identification encoding method for a digital fingerprint code may be comprised in the manufacturing of a decorative workpiece.

In another preferred embodiment the identification encoding method determines a curve in a logo which is comprised as content object in the document. A logo is a graphic mark or emblem commonly used by commercial enterprises, organizations and even individuals to aid and promote instant public recognition. Logos are either purely graphic (symbols/icons) or are composed of the name of the organization (a logotype or wordmark).

In a preferred embodiment a reproduced digital fingerprint code is attached to a security item such as an identity card (IC), a driving license. A preferred embodiment is a security item comprising a reproduced digital fingerprint code.

In another preferred embodiment a reproduced digital fingerprint code is attached to a workpiece or package of a workpiece such as a package of medicines. This enables the possibilities of track-and-trace a workpiece or the enclosed workpiece in a package or the possibilities of adding secured information to a workpiece or the package of a workpiece. A digital fingerprint code may be embedded in the design of the package which makes it difficult to detect and to reproduce by others suppliers. A preferred embodiment is a workpiece such as a decorative workpiece or a package of a workpiece comprising a reproduced digital fingerprint code.

In another preferred embodiment a reproduced digital fingerprint code is attached to a package of a food such as a package of carrots. This enables the possibilities of track-and-trace the enclosed food in a package, or the possibilities of adding secured information to a package of a food. A digital fingerprint code may be embedded in the design of the package which makes it difficult to detect and to reproduce by others suppliers, thus against counterfeiting. A preferred embodiment is a food packaging comprising a reproduced digital fingerprint code.

In another preferred embodiment a reproduced digital fingerprint code is attached to a package of application software on a data storage device such as a package of an operating system on a Compact Disc Read-only memory (CD-ROM). This enables the possibilities of track-and-trace application software or the possibilities of adding secured information to a package of application software on a data storage device. A digital fingerprint code may be embedded in the design of the package which makes it difficult to detect and to reproduce by others suppliers. A preferred embodiment is a package of application software on a data storage device comprising a reproduced digital fingerprint code.

In another preferred embodiment a reproduced digital fingerprint code is attached to a medical device such as a digital radiography panel (DR-panel). This enables the possibilities of track-and-trace the medical device or the possibilities of adding secured information to the medical device. A digital fingerprint code may be attached to the medical device to make it difficult to detect and make it difficult to reproduce the medical device, thus against counterfeiting. A preferred embodiment is a medical device comprising a reproduced digital fingerprint code.

Another preferred embodiment is a container comprising a liquid wherein the container comprises a digital fingerprint code.

Identification Decoder

To decode a digital fingerprint code, an identification decoder is needed for example to identify the item whereon the digital fingerprint code is attached. An identification decoder is also called an identification code reader or identification code interpreter.

An identification decoding method, also called an identification code reading method or identification code interpreting method, is a computer implemented method that is performed on a hardware (HW) configuration, such as a computer, tablet computer and the like, comprising a central processing unit (CPU), a memory, a storage device such as a hard disk drive (HDD), a communication interface (IF) device that sends and receives data to and from other hardware configurations via a network. The hardware configuration may comprise a user interface (UI) device that may comprise a display device.

In a preferred embodiment the identification decoder comprises one or more GPU's for faster reading of a captured digital fingerprint code, which is a digital fingerprint code (DF code) on a reproduction of a document, captured by a digital imaging device.

The identification decoder preferably has a transfer device, such as USB-cable and USB-connector, and a memory to transfer an image captured digital fingerprint code from a digital imaging device and to image manipulate the image captured digital fingerprint code. More preferably a digital imaging device is comprised in the identification decoder.

The identification decoder for a digital fingerprint code may comprising the following steps:
  capturing a digital fingerprint code (DF code) by a digital imaging device; and
  determining an image captured curve in the image captured digital fingerprint code; and
  determining a set of two-dimensional points ($p_k$) on the image captured curve a set of thicknesses ($t_k$) of the image captured curve; and
  determining the plurality of N-bit data from the set of thicknesses ($t_k$) and the location of the set of two-dimensional points ($p_k$) on the image captured curve.

The determination of the image captured curve is performed by a curve searcher. The determination in a set of two-dimensional points ($p_k$) on the image capture curve the set of thicknesses ($t_k$) is performed by a thickness quantifier. The determination the plurality of N-bit data from the set of thicknesses ($t_k$) is performed by an interpreter.

Prior the determining the image captured curve in the image captured digital fingerprint code, the operator of the identification coder may select a region of interest of the image captured digital fingerprint code or may scaling the image captured digital fingerprint code for example until the borders of the digital fingerprint code in the image captured digital fingerprint code. This enhances the speed of decoding the digital fingerprint code.

The determination of a image captured curve in an image captured digital fingerprint code may be performed by image analysis method which may comprises fast Fourier transformations (FFT), histogram calculations and filtering methods.

The plurality of N-bit data may be converted to the content (CNT) of the digital fingerprint code. This step is also called the N-bit data decoding step of a digital fingerprint code (DF code). The decoding step is done by a converter.

In a preferred embodiment, the content is analysed after the decoding step of the digital fingerprint code and comprising the step of selecting according the analysis an action from a set of actions. An action may for example be opening a web-page with as address the content (CNT) in the image captured digital fingerprint code.

In another preferred embodiment, the plurality of N-bit data is analysed and comprising the step of selecting according the analysis an action from a set of actions.

The distances between two succeeding two-dimensional points ($p_k$) on the image captured curve is preferably smaller than 10 times the minimum pixel width or height of the captured digital fingerprint code and more preferable smaller than 5 times, most preferable smaller than 2 times, the minimum pixel width or height of the captured digital fingerprint code, because this guarantees a better sampling of the image captured curve from the digital fingerprint code so the generation of a one-dimensional signal and the determination of the plurality of N-bits from the identification code, embedded in the digital fingerprint code, is easier.

In the decoding step the plurality of N-bit data may be decompressed and/or decrypted and/or error corrected to convert the plurality of N-bit data to the content (CNT) of the digital fingerprint code. The error correcting of the plurality of N-bit data is preferably based on error-coding code comprised in the plurality of N-bit data.

In a preferred embodiment the image captured curve is approximated by a path (P) which comprises a plurality of two-dimensional points ($p_k$); and wherein in the set of two-dimensional points ($p_k$) a set of thicknesses ($t_k$) is determined.

Another preferred embodiment may comprise the step:
  approximating the skeleton (S) of the image captured curve in the image captured digital fingerprint code which comprises a plurality of two-dimensional points ($p_k$). The skeleton (S) may be converted to a path (P) to approximate the image captured curve.

To determining the set of two-dimensional points ($p_k$) on the image captured curve easily the curves in the set of curves in the digital fingerprint code, the curves may not intersects with each other and/or may not intersects with themselves. A curve in a preferred embodiment is in a preferred embodiment a non-self-intersecting curve.

A skeleton of an image captured curve is a thin version of that shape that is equidistant to its boundaries of the image captured curve. The skeleton usually emphasizes geometrical and topological properties of the image captured curve, such as its connectivity, topology, length, direction, and width. It serves as a representation of the image captured curve.

Methods to determine a skeleton are disclosed in chapter 5 of J. R. PARKER. Algorithms for image processing and computer vision. John Wiley. ISBN 0471140562.

The conversion of a skeleton (S) of the image captured curve to a path (P) in a preferred embodiment is done by tracing methods, also called vectorization methods. The tracing method preferably comprising an edge detection algorithm.

For a fast reading of captured digital fingerprint code the skeleton of the image captured curve is determined by a distance skeleton algorithm such as Zhang-Suen parallel thinning method which is disclosed at T. Y. ZHANG AND C. Y. SUEN. A fast parallel algorithm for thinning digital patterns. *Communications of the ACM*. 1984, vol. 27, no. 3, p. 236-239.

Prior the step of determining the image captured curve the image captured digital fingerprint code may be converted to an indexed color image and more preferably to a binary image. The conversion to an indexed color makes it easier to detect the image captured curve by image manipulation methods such as edge detection.

Captured digital fingerprint codes may be captured with for example different illumination conditions for the same digital fingerprint code. Also for example the different resolutions of digital imaging devices, the angles wherein the digital fingerprint code is taken may give different algorithm to make identification readable for a set of digital imaging devices. That's why in a preferred embodiment the image captured digital fingerprint code is converted to an indexed color image such as a binary image so the determination of the image captured curve is easier and the determination of the plurality of N-bit data is faster determined.

The image captured curve and/or image captured digital fingerprint code may be morphed by morphological image methods such as dilatation, scaling, rotating, translating, warping to enhance fast determination of an image captured curve of the digital fingerprint code.

Methods of morphology in images are disclosed J. R. PARKER. Algorithms for image processing and computer vision. John Wiley. ISBN 0471140562. And especially in chapter 2 and 3.

By following the trace of the image captured curve or the skeleton (S) or the path (P), the thicknesses and the length of the thicknesses in the image captured curve is determined in a plurality of points. These determinations are in a preferred embodiment of the identification decoder to a plurality of N-bit data.

If for each value of N-bit data in a preferred embodiment has a color ($C_{N,i}$), tracing of the image captured curve or the skeleton (S) or the path (P), the thickness and the length of the thicknesses and the color of the thicknesses is determined in a plurality of points.

In a preferred embodiment the digital fingerprint code is embedded in a nerve or wood grain imperfection of a decorative pattern comprised in a decorative workpiece, such as a decorative panel, comprising a wood pattern as decorative pattern. Thus in a preferred embodiment the identification decoding method comprises the following step:
- capturing the decorative pattern in a decorative workpiece; and
- determining an image captured nerve or image captured wood grain imperfection in the image captured decorative pattern; and
- determining a set of two-dimensional points ($p_k$) on the image captured nerve a set of thicknesses ($t_k$) of the image captured nerve; and
- determining the plurality of N-bit data from the set of thicknesses ($t_k$) and the location of the set of two-dimensional points ($p_k$) on the image captured nerve or the image capture wood grain imperfection.

Instead of a nerve, the curve may be any wood grain imperfections, such as knots, cracks in the wood pattern.

A nerve is a wood grain line in the wood pattern which is caused by growth rings, especially smaller growth rings, in wood.

Digital Fingerprint Code

A digital fingerprint code (DF code) is an optical-machine-readable reproduction of content (CNT). The digital fingerprint code in a preferred embodiment is readable by a digital imaging device.

The digital fingerprint code in a preferred embodiment is embedding a plurality of N-bit data to represent a content (CNT). The value of an N-bit data is selected from 0 to (2N-1) and hence there are two to the power of N possible values. N is a positive natural number and N is larger than zero.

The content may comprise a serial number, a code name, a date, such as the date of reproducing, of an item whereon the digital fingerprint code is attached. The content may comprise the reproduction characteristics of the reproducing of the digital fingerprint code.

The plurality of N-bit data is preferably a plurality of hexadecimal numbers (N=4), more preferably a plurality of octal numbers (N=3) and most preferably a plurality of binary data (N=1), also called a bit stream.

Larger the amount of possible values in an N-bit data of the preferred embodiment, higher the amount of storage capacity of the digital fingerprint code.

The storage capacity defines the maximum amount of bits that a digital fingerprint code (DF code) embeds a plurality of N-bit data. The storage capacity is sometimes defined by the maximum amount of bytes that a digital fingerprint code (DF code) embeds a plurality of N-bit data.

Larger the total length of the set of curves in the preferred embodiment, higher the amount of storage capacity of the digital fingerprint code on the set of curves.

In a preferred embodiment the storage capacity of the digital fingerprint code on the set of curves is between 1 bit and 10 bits per millimetre, more preferably between 1 bit and 20 bits per millimetre and most preferably between 1 bit and 50 bits per millimetre.

Smaller the minimal thickness ($T_{N,i}$) and smaller the minimal length ($L_{N,i}$) of a value from an N-bit data, for example by a larger output resolution of an content output device, larger the storage capacity of the digital fingerprint code.

In a preferred embodiment a digital fingerprint code (DF code) is visible by only using human eyes at a viewing distance between 0 millimetres and 200 millimetres, more preferably between 0 decimetre and 50 millimetres and most preferably between 0 decimetre and 10 millimetres.

The plurality of N-bit data may comprise a header sequence of plurality of N-bit data to identify easier the start of the plurality of N-bit data and/or a tail sequence of plurality of N-bit data to identify easier the tail of the plurality of N-bit data. Preferably the header sequence and/or tail sequence have a fixed size.

The plurality of N-bit data may comprise an order sequence of a plurality of N-bit data to identify the order of the curve in the set of curves from the preferred embodiment. This order sequence is used to ordering the set of plurality of N-bit data from each curve and to concatenate them in the correct order to one set of plurality of N-bit data.

The plurality of N-bit data may comprise an error-correcting code. The error-correcting code may comprise parity checks and/or check sums to improve the error-correcting code.

An error-correcting code is to achieve error detection and correction by adding redundancy, for example by adding extra to an content (CNT), which identification decoders can use to check consistency of the content (CNT), and to recover data determined to be corrupted. In a preferred embodiment the plurality of N-bit data comprises a Hamming code as error-correcting code. An example of a high speed Hamming code circuit is disclosed in U.S. Pat. No. 4,276,647 (XEROX CORPORATION).

An error correction capability in a digital fingerprint code (DF code) has advantage if the reproduction of a digital fingerprint code (DF code) in a preferred embodiment is dirty or damaged.

The plurality of N-bit data may comprise a compressed plurality of N-bit data, compressed by a data compression method such as run-length-encoding method. Preferably the compressed N-bit data is compressed by a lossless data compression method. Lossless data compression methods exploit statistical redundancy to represent data more concisely without losing information, so that the process is reversible by decompression.

The digital fingerprint code in a preferred embodiment comprises a set of curves wherein an content (CNT) is embedded by a plurality of N-bit data;
wherein each possible value of N-bit data has a thickness $(T_{N,i})$ and length $(L_{N,i})$; and
wherein the plurality of N-bit data comprises a first N-bit data $(N_1)$, subsequent by a different second N-bit data $(N_2)$ on a curve of the set of curves; and
wherein the thickness $(T_{N,i,1})$ of the value $(v_{N,1})$ of the first N-bit data $(N_1)$ on the curve is different from the thickness $(T_{N,i,2})$ of the value $(v_{N,2})$ of the second N-bit data $(N_2)$ and/or wherein the length of the value $(v_{N,1})$ of the first N-bit data $(N_1)$ on the curve is different from the length $(L_{N,i,2})$ of the value $(v_{N,2})$ of the second N-bit data $(N_2)$.

In a preferred embodiment the plurality of N-bit data comprises more than two N-bit data's.

For the sake of clarity, it should be clear that a curve is a two-dimensional continuous line which doesn't have to be straight. A curve has a start point and an end point. The start point and the end point may be the same such as a circular curve. The length of the curve is preferably finite and bounded. In a preferred embodiment the digital fingerprint code comprises a set of non-self-intersecting-curves wherein a content (CNT) is embedded by a plurality of N-bit data with more than two N-bit data's. A curve in a preferred embodiment is continue and uninterrupted.

The thickness $(T_{N,i})$ and length $(L_{N,i})$ for each possible value of N-bit data gives the possibilities to get an one-to-one relation between thickness-and-length and a value of an N-bit-data.

The thickness $(T_{N,i})$ is preferably between 0.002 mm and 5 mm and more preferably between 0.005 mm and 5 mm and most preferably between 0.005 mm and 2 mm.

The length $(L_{N,i})$ is preferably between 0.002 mm and 5 mm and more preferably between 0.005 mm and 5 mm and most preferably between 0.005 mm and 2 mm.

The minimal thickness $(T_{N,i})$ and minimal length $(L_{N,i})$ depends on the true output resolution of the content output device and the quality of the reproduction of the digital fingerprint code (DF code).

As example of a preferred embodiment a 100% black digital finger print code is printed at 4000 dpi with an offset printing device. One pixel is minimal 0.00635 millimetre (mm) but to detect the thicknesses on the curve by a preferred identification decoding method the thickness the minimal thicknesses is 4 pixels, which is 0.0254 millimetre, and more preferably 16 pixels, which is 0.1016 millimetre.

Assuming the digital finger print code is printed at 10160 dpi with an offset printing device. One pixel is minimal 0.0025 mm but to detect the thicknesses on the curve by a preferred identification decoding method the minimal thicknesses is 4 pixels, which is 0.01 mm, and more preferably 16 pixels, which is 0.04 mm.

In a preferred embodiment the minimal thickness for a value of an N-bit in the digital fingerprint code is between 2 and 100 pixels, more preferably between 4 and 50 pixels and most preferably between 8 and 25 pixels. Larger the minimal thickness, lower the print quality of the printed digital fingerprint have to be but more noticeable the reproduced digital fingerprint code is by the human eye.

In a preferred embodiment the minimal length for a value of an N-bit in the digital fingerprint code is between 2 and 100 pixels, more preferably between 4 and 50 pixels and most preferably between 8 and 25 pixels. Larger the minimal thickness, lower the print quality of the printed digital fingerprint have to be but more noticeable the reproduced digital fingerprint code is by the human eye.

In a preferred embodiment the digital fingerprint code has for each value of N-bit data a color $(C_{N,i})$; and
the color $(C_{N,i,1})$ of the value $(v_{N,1})$ of the first N-bit data $(N_1)$ on the curve is different from the color $(C_{N,i,2})$ of the value $(v_{N,2})$ of the second N-bit data $(N_2)$.

The digital fingerprint code with for each value of N-bit data a color $(C_{N,i})$ may only use a specific amount of colors. The color $(C_{N,i})$ may be selected from a set of colors.

The thickness $(T_{N,i})$, length $(L_{N,i})$ and color $(C_{N,i})$ for each possible value of N-bit data gives the possibilities to get an one-to-one relation between a value of an N-bit-data and thickness-and-length-and-color.

If in the digital fingerprint code the amount of the curves in the set of curves is more than one, the digital fingerprint code may comprise another curve wherein a binary code is embedded with a plurality of M-bit data with more than two M-bit data's; and wherein M is different to N; and
wherein each possible value of M-bit data has a thickness $(T_{M,j})$ and length $(L_{M,j})$ a curve; and
wherein the plurality of M-bit data comprises a first M-bit data $(M_1)$, subsequent by a different second M-bit data $(M_2)$; and
wherein the thickness $(T_{M,j,1})$ of the value $(v_{M,1})$ of the first M-bit data $(m_1)$ on the another curve is different from the thickness $(T_{M,j,2})$ of the value $(v_{M,2})$ of the second M-bit data $(M_2)$ and/or wherein the length $(L_{M,j,1})$ of the value $(v_{M,1})$ of the first M-bit data $(M_1)$ on the another curve is different from the length $(L_{M,j,2})$ of the value $(v_{M,2})$ of the second N-bit data $(M_2)$.

The digital fingerprint code is in a preferred embodiment comprised in a document and in a more preferred embodiment comprised in a content object of a document.

The digital fingerprint code is preferably a raster graphic and more preferably a vector graphic. The digital fingerprint code may comprise a plurality of raster graphics and/or a plurality of vector graphics. For example the curve is raster graphic and the thicknesses on the curve which represents the plurality of the N-bit data may be a plurality of vector graphics.

In a preferred embodiment the plurality of N-bit data is an unipolar line code. It is the simplest line code, directly encoding the bit stream, and is analogous to on-off keying in modulation.

Digital Imaging Devices

A digital imaging device captures an image, for example for a reproduced document, and generates a color signal from the image to an output device having specific color sensitivities, the digital imaging device further being one of many devices of the same type useful with the output device. The digital imaging device, for example a digital camera, includes a color sensor for capturing the image and generating a color signal from the captured image, the color sensor having predetermined spectral sensitivities, and an optical section that is interposed in the image light directed to the color sensor, the optical section also having predetermined spectral characteristics. The combination of the spectral sensitivities of the color sensor and the spectral characteristics of the optical section uniquely distinguish this particular digital imaging device from other digital imaging devices of the same type.

In a preferred embodiment the digital imaging device comprises a charge-coupled device (CCD) camera, which is a digital video camera that feeds its image in real time to a computer or computer network such as an IP camera (which uses a direct connection using ethernet or Wi-Fi) or a webcam connected by a USB cable, FireWire cable or similar cable. Such a web-cam is preferably comprised in a mobile phone or mobile computer such as a tablet computer.

In another preferred embodiment the digital imaging device is a digital microscope which comprises a charge-coupled device (CCD) camera that feeds its image in real time to a computer or computer network after the image is magnified more than eight times, preferably more than 30 times, by an optical system. The maximum magnification of the digital microscope is preferably larger than 30 times, more preferably larger than 50 times and most preferably larger than 100 times. If the digital fingerprint code is small, the reproduced digital fingerprint code have to be captured via an optical system by a digital imaging device, else the identifying decoder may not read the plurality of N-bit data, embedded in the digital fingerprint code.

A digital imaging device may comprise a complementary metal-oxide-semiconductor (CMOS) sensor.

Preferably the digital imaging device comprises an illumination device, such as a light-emitting-diode (LED) flash, to capture the digital fingerprint code of a preferred embodiment by the light of the illumination device in darker situations.

To enhance the storage capacity of the digital fingerprint code on the set of curves the resolution of the digital imaging device is preferably more than 5 megapixels (MPx). One megapixel (MPx) is one million pixels, and is a term used not only for the number of pixels in an image, but also to express the number of image sensor elements of digital imaging devices or the number of display elements of display devices. For example the mobile phone iPhone™ 4 features a backside-illuminated 5 megapixel rear-facing camera with a 3.85 mm f/2.8 lens.

The resolution of a digital imaging device is preferably more than 8 megapixels and more preferably more than 12 megapixels.

The digital imaging device is preferably a three color digital camera, such as an RGB digital camera.

The digital imaging device may comprise an image manipulation device to manipulating a captured image, such as a captured digital fingerprint code prior to transfer it to an identification decoder. The image manipulation device of the digital imaging device may comprise one or more GPU's for faster manipulating the captured image, such as a captured digital fingerprint code. An example of manipulating a captured image in a digital imaging device is color conversion (CMS) to an independent color space, such as CIE Lab or to a dependent colorant space, such as sRGB as specified in IEC 61966-2-1:1999. Another digital example of manipulating a captured image in a digital imaging device is digital magnifying the captured image by a determined magnifier.

The digital imaging device may comprise an image manipulation device which performs an image processing method selected from: color and/or colorant space converting (CMS); auto-contrasting; unsharp masking (USM); content object location correcting; noise reducing; despeckling; applying a convolution; rotating; scaling; cropping; despeckle; destair; casting.

Content Output Devices

More and more content output devices, such as display devices, projector devices and printer devices, are developed for the reproduction of content such as images and text. Examples of content output devices that are used to reproduce a document are CRT's, LCD's, plasma display panels (PDP), electroluminescent displays (ELD), carbon nanotubes, quantum dot displays, laser TV's, Electronic paper, E ink, projection displays, conventional photography, electrophotography, dot matrix printers, thermal transfer printers, dye sublimation printers and inkjet systems to name a few. Also the conventional printing systems such as offset printing, lithography, rotogravure, flexography, letterpress printing, and screen-printing are developed for the reproduction of images and/or text and are thus also content output devices.

An apparent output resolution of a content output device refers to the fact that the human eye perceives an image as having greater detail than it does in physical reality, which is defined by the true output resolution. The apparent and the true output resolutions are defined in dots per inch (dpi), especially for printer devices and defined in pixels per inch (ppi), especially for display devices and also called pixel density. One inch is exactly 25.4 millimetre.

In a preferred embodiment the digital fingerprint code is reproduced a content output device with a true output resolution more than 300 dots per inch or 300 pixels per inch and in a more preferred embodiment the digital fingerprint code is reproduced by a content output device with a true output resolution more than 2400 dots per inch (dpi) and in a most preferred embodiment the digital fingerprint code is reproduced by a content output device with a true output resolution more than 4800 dots per inch (dpi).

Larger the true output resolution and the apparent output resolution of a content output device, smaller a digital fingerprint code (DF code) and/or smaller the thickness differences ($T_{N,i}$) and smaller the length differences ($L_{N,i}$) in a digital fingerprint code (DF code) may be reproduced.

Smaller digital fingerprint codes and/or smaller thickness differences and/or length differences in a digital fingerprint code (DF code) makes it for example possible to write and to reproduce digital fingerprint codes that are not visible by the human eye at an distance of more than 20 centimetre, which is a normal reading distance.

Rotogravure (roto or gravure for short) is a type of intaglio printing process, which involves engraving the image onto an image carrier. In gravure printing, the image is engraved onto a cylinder because, like offset printing and flexography, it uses a rotary printing press. Rotogravure process by a gravure printer is still used for commercial printing of magazines, postcards, and corrugated (cardboard) product packaging and the manufacturing of decorative workpieces.

Offset printing, which is an example of a conventional printing system, is a printing technique in which ink is spread on a metal plate with etched images, then transferred (offset) to an intermediary rubber blanket and finally to the printing surface by pressing the paper to the blanket. When printing color images, four plates are normally used, one for each CMYK component. Additionally, spot colors can be added by adding a new layer with the specific pigment needed.

Nowadays modern offset systems use computer to plate technology, which create plates directly from the computer output, contrary to the older technology where photographic films were created by computers and then used for creating the plate. Offset presses are big, expensive and complex devices which require experienced operators to run them. The process of preparing a document to be printed in an offset press is complicated, since plates have to be created and the operators have to spend some time manually preparing and calibrating the offset press to get the desired result. Even though this process is rather expensive and slow, the actual printing process is cheap, fast and produces high image quality. This makes it a good solution for producing large amounts of copies. For this reason, it has become the most popular way of commercial printing and it is largely used for printing newspapers, magazines, books, etc.

In an inkjet system, which is an example of a digital printing system, the ink is directly deposited, also called jetted, onto a substrate, simplifying the printing mechanism and eliminating all the process of creating plates. Besides, it avoids the extra job that offset operators need to do in order to get the offset press ready for printing. Both things lead to a shorter turnaround time, cheaper starting point for a single copy and copies customization which is not possible in offset since it is unviable to create a different plate for each copy.

Another advantage is the possibility of print a wider gamut (closer to the RGB gamut) than with offset. Also it is easier to print in almost every surface: wood, ceramic, plastic, etc. The quality of offset presses has always been considered higher in terms of resolution and crispness than for digital presses such as inkjet systems, although nowadays there are digital presses such as inkjet systems matching up the quality of offset presses. Nevertheless, digital printing has some disadvantages with respect to offset which can make difficult the decision of choosing one or another printing method. The resolution of a digital press depends on the dots per inch (dpi) parameter. Even though this parameter has been gradually increasing over the years, the quality of a digital press cannot be compared yet to the quality of an offset press in terms of resolution and crispness. Another shortcoming of digital presses is the handling of spot colors. Typically a digital press uses CMYK pigments to represent all the colors. As mentioned, only a subset of spot colors can be properly reproduced using CMYK. Some complex digital presses use an additional fifth or sixth colorant which helps to the reproduction of a larger subset of spot colors but still not enough to reproduce all of them in a good way.

Preferably the digital fingerprint code is reproduced by offset printing and more preferably the digital fingerprint code of a preferred embodiment is reproduced by inkjet printing.

In another preferred embodiment the digital fingerprint code is reproduced by a micro-lithography device or by a nano-lithography device. Micro-lithography and nano-lithography refer specifically to lithographic patterning methods capable of structuring material on a fine scale. Typically, features smaller than 10 micrometers are considered micro-lithographic, and features smaller than 100 nanometers are considered nano-lithographic. Photolithography is one of these two methods, micro- and nano-lithography, often applied to semiconductor manufacturing of microchips. Photolithography is also commonly used for fabricating Microelectromechanical systems (MEMS) devices. Photolithography generally uses a pre-fabricated photomask or reticle as a master from which the final pattern is derived. Although photolithographic technology is the most commercially advanced form of nanolithography, other techniques are also used for example electron beam lithography is capable of much true output resolutions (sometimes as small as a few nanometers).

Graphic Processing Units

Graphic Processing Units (GPU's) have been used to render computer graphics for years. Nowadays they are also used for general-purpose tasks due to their highly parallel structure, making them more efficient than Central Processing Units (CPU's).

GPU's can be combined with CPU's to achieve greater performance. In this way, serial parts of the code would run on the CPU and parallel parts would do it on the GPU. While CPU's with multiple cores are available for every new computer and allow the use of parallel computing, these are focused on having a few high performance cores. On the other hand, GPU's have an architecture consisting of thousands of lower performance cores making them especially useful when large amount of data have to be processed.

One of the most popular tools available on the market of GPU computing is CUDA. CUDA is a parallel computing platform and programming model created by Nvidia™ and available only for their GPU's. The main advantage of CUDA is its ease of use, using the language known as CUDA C which is essentially an extension of C, with similar syntax and very easy to integrate in a C/C++ environment.

The needed data is first copied from the main memory to the GPU memory (①), the CPU sends an instruction to the GPU (②), the GPU executes the instruction in all the parallel cores at the same time (③), and the result is copied back from the GPU memory to the main memory (④).

CUDA parallel execution units consist of threads grouped into blocks. Combining the use of blocks and threads the maximum number of available parallel units can be launched, which for the latest GPU's can be more than 50 million. Even though this is a great amount of parallel capability, there are some cases where data might exceed the limit. In those cases, the only possibility is to iterate through the grid of millions of parallel units as many times as needed till all the data is processed.

Path

A path in a preferred embodiment is defined as a sequence of minimal two two-dimensional points, also called 2D-points, which are connected with a sub-path. A sub-path may be a curve defined as a 2D-function between 2D-points such as a line, polygon, a Bezier curve or a parametric equation. It is not necessary that each sub-path is using the same 2D-function. A 2D-point is defined as a point with an x-coordinate and y-coordinate as used in a Cartesian coordinate system. A 2D-point of a path may be referred as a point.

Decorative Image

A decorative image is an image representing wood, stone, rock or fantasy pattern.

A decorative image is achieved by suitable commercially available hardware, such as scanning a photograph or taking an image by a digital camera, and commercially available software, such as Adobe Photoshop™ to manipulate and create decorative images.

The content of a decorative image is preferable defined in raster graphics format such as Portable Network Graphics (PNG), Tagged Image File Format (TIFF), Adobe Photoshop Document (PSD) or Joint Photographic Experts Group (JPEG) or bitmap (BMP) but more preferably in vector graphics format, wherein the decorative image as raster graphics format is embedded. Preferred vector graphics formats are Scale Vector Graphics (SVG) and AutoCad Drawing Exchange Format (DXF) and most preferably the decorative image is embedded in a page description language (PDL) such as Postscript (PS) or Portable Document Format (PDF).

A decorative image may be stored and/or loaded as one or more files on a memory of a computer. A preferred embodiment may comprise a method to load a decorative image into a memory of a computer.

Decorative Patterns

The decorative pattern is a region-of-interest from a decorative image so variances in decorative patterns may be achieved by selecting different region-of-interests in the decorative image. The ratio of the area of such a region-of-interest as decorative pattern and the area of the decorative image is preferably between 50% and 100%, more preferably between 10% and 100% and most preferably between 1% and 100%. The area with the content of the region-of-interest as decorative pattern is also called content area. The size of the region-of-interest and thus the decorative pattern may have a width between 50 mm and 4000 mm, and a length between 100 mm and 6000 mm or more.

A decorative pattern is preferable rectangular shaped but it can also be triangular, quadratic, rectangular, heptagonal, pentagonal and octagonal, or elliptical shaped. A decorative pattern may have a side with 1 or more curved parts. The advantage of rectangular shaped decorative patterns is the ease of cutting to a decorative workpiece. Rectangular or non-rectangular shaped decorative patterns may be cut by cutting plotters. The use of cutting plotters is more time-consuming but non-rectangular shaped decorative patterns expand the amount of assembling creations of decorative workpieces such as mosaic flooring with laminates, or design furniture.

The content of a decorative pattern is preferable defined in raster graphics format such as Portable Network Graphics (PNG), Tagged Image File Format (TIFF), Adobe Photoshop Document (PSD) or Joint Photographic Experts Group (JPEG) or bitmap (BMP) but more preferably in vector graphics format, wherein the decorative pattern as raster graphics format is embedded. Preferred vector graphics formats are Scale Vector Graphics (SVG) and AutoCad Drawing Exchange Format (DXF) and most preferably the decorative pattern is embedded in a page description language (PDL) such as Postscript (PS) or Portable Document Format (PDF).

A decorative pattern may be stored and/or loaded as one or more files on a memory of a computer. A preferred embodiment may comprise a method to load a decorative pattern to a memory of a computer.

Decorative Workpiece

The decorative workpieces are preferably rigid or flexible panels, but may also be rolls of a flexible substrate. In a preferred embodiment the decorative workpieces are selected from the group consisting of kitchen panels, flooring panels, furniture panels, ceiling panels and wall panels.

In a more preferred embodiment, the decorative workpiece includes a tongue and a groove capable of achieving glue less mechanical join.

The decorative workpieces, especially decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative workpieces as exemplified by EP1567334 (FLOORING IND).

In a preferred embodiment, the decorative panels are made in the form of rectangular oblong strips. The dimensions thereof may vary greatly. Preferably the panels have a length exceeding 1 meter, and a width exceeding 0.1 meter, for example the panels can be about 1.3 meter long and about 0.15 meter wide. According to a special preferred embodiment the length of the panels exceeds 2 meter, with the width being preferably about 0.2 meter or more. The decorative pattern of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, for example as described in U.S. Pat. No. 4,952,277 (BET PAPERCHEM)

In another preferred embodiment, the core layer is a board material composed substantially of wood fibres which are bonded by means of a poly-condensation glue, wherein the poly-condensation glue forms 5 to 20 percent by weight of the board material and the wood fibres are obtained for at least 40 percent by weight from recycled wood. Suitable examples are disclosed by EP2374588 (UNILIN).

Instead of a wood based core layer, also a synthetic core layer may be used, such as those disclosed by US2013062006 (FLOORING IND). In a preferred embodiment, the core layer comprises a foamed synthetic material, such as foamed polyethylene or foamed polyvinyl chloride.

Other preferred core layers and their manufacturing are disclosed by US2011311806 (UNILIN) and U.S. Pat. No. 6,773,799 (DECORATIVE SURFACES).

The thickness of the core layer is preferably between 2 and 12 mm, more preferably between 5 and 10 mm.

Tongue-and-Groove Profile

The side edge of a decorative workpiece of the set of separate decorative workpiece may be milled to produce a tongue or a groove profile, to make it possible to interconnect decorative workpieces, also click decorative workpieces, such as click laminates. The advantage thereof is an easy assembly requiring no glue. The shape of the tongue and groove profile necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

Methods for Manufacturing Decorative Workpieces

The method for manufacturing decorative workpieces according to a preferred embodiment may comprise the steps:
gravure printing the decorative pattern; and
impregnating a paper substrate with a thermosetting resin; and
heat pressing the thermosetting resin impregnated paper substrate carrying the inkjet printed decorative pattern into a decorative workpiece.

The method for manufacturing decorative workpieces according to a preferred embodiment may comprise the steps of:
inkjet printing a decorative pattern, preferably with one or more aqueous inkjet inks on a paper substrate; and
impregnating a paper substrate with a thermosetting resin; and
heat pressing the thermosetting resin impregnated paper substrate carrying the inkjet printed decorative pattern into a decorative workpiece.

In a preferred embodiment, the method for manufacturing decorative workpieces comprises, in order, the steps of:
a) inkjet printing a decorative pattern with one or more aqueous inkjet inks on a paper substrate; and
b) impregnating the inkjet printed paper substrate with a thermosetting resin; and
c) heat pressing the thermosetting resin impregnated paper substrate carrying the inkjet printed decorative pattern into a decorative workpiece.

In another preferred embodiment, the method for manufacturing decorative workpieces includes, in order, the steps of:
a) impregnating a paper substrate with a thermosetting resin;
b) inkjet printing a decorative pattern with one or more aqueous inkjet inks on the thermosetting resin impregnated paper; and
c) heat pressing the thermosetting paper carrying the inkjet printed decorative pattern into a decorative workpiece. In the latter, financial losses due to cutting errors are minimized.

The thermosetting resin impregnated paper carrying the inkjet printed decorative pattern is heat pressed between a protective layer containing a thermosetting resin and a core layer, with the decorative pattern facing the protective layer. In the latter, the thermosetting resin impregnated paper preferably includes a whitening agent for masking surface defects of the core layer.

Alternatively the thermosetting resin impregnated paper carrying the decorative pattern is heat pressed as a protective layer into a decorative workpiece, with the decorative pattern facing towards a core layer present in the decorative workpiece. The protective layer (or overlay) contains no or substantially no whitening agent because the overlay becomes transparent after heat pressing so that the decorative pattern can be viewed. The decorative pattern must face the core layer because otherwise the decorative pattern would rapidly deteriorate through wear. In a further preferred embodiment the decorative pattern includes as outermost ink layer a white ink layer. The outermost white ink layer means that the decorative pattern inkjet printed on the overlay covered by a white ink layer, preferably applied by inkjet printing, but e.g. screen printing or flexographic printing is also possible. By having an outermost white ink layer on the decorative pattern, the paper layer between the core layer and the overlay can be omitted, which represents not only a cost benefit but also a simplified manufacturing process.

In a preferred embodiment of the manufacturing method, the thermosetting resin impregnated paper includes a coloured paper substrate, more preferably a bulk coloured paper substrate. The use of a coloured paper substrate reduces the amount of inkjet ink required to form the decorative pattern.

In a preferred embodiment of the manufacturing method, the coloured paper substrate is prepared by impregnating the paper substrate with a coloured thermosetting resin.

In a preferred embodiment of the manufacturing method, the protective layer includes hard particles in an amount between 1 $g/m^2$ and 100 $g/m^2$.

In a preferred embodiment of the manufacturing method, the thermosetting resin is a melamine based resin. A melamine based resin is preferred not only because of its excellent physical properties against wear, but also because of the clear transparency after heat pressing showing no discolouration.

In a preferred embodiment of the manufacturing method, the protective layer includes hard particles in an amount between 1 $g/m^2$ and 100 $g/m^2$.

In a preferred embodiment, the method of manufacturing a decorative workpiece comprises the step of hot pressing at least the core layer and the decorative layer which includes a decorative pattern and a thermosetting resin provided paper. Preferably the method of the invention forms part of a DPL (Direct Pressure Laminate) process as above described, wherein the decorative layer is taken up in a stack to be pressed with the core layer and a balancing layer, and preferably also a protective layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the inkjet printed decorative pattern, wherein the thermosetting resin may be a colored thermosetting resin to reduce the amount of inkjet ink to be printed.

In a preferred embodiment of the manufacturing method, the inkjet printing is performed by a single pass printing inkjet printing process. This allows for a high productivity ($m^2$ decorative workpiece per hour). Alternatively a plurality of multipass inkjet printers is used.

EXAMPLES

An example of an identification encoding method for digital fingerprint codes is described and an example of an identification decoding method for digital fingerprint codes is described.

Example of an Identification Encoding Method

An example of a preferred embodiment is detailed as followed:

In this example the focus of the content is a string message, but since all data can be represented by bits, most of the methods in this section are independent of the kind of data. The string message is converted to a plurality of binary data.

Representing Bits by Line Thickness

The first step in encoding any kind of data is choosing in the example a way to represent a value '1' and a value '0' with the given medium. The given medium is, in this case, is the thickness of the line. Three possibilities are explored:

a) The first way of representing bits is as a piece of line of fixed length, separated by a shorter piece of line, with three different levels of thickness: the smallest for the transition between two bits, the thickest for a one, and the one in between for a zero. This way of representing bits is shown as a signal in FIG. 1.

b) The second way of representing bits is using only two levels. One level to signal a change of the 'current' bit, and a second to decide how much times that bit was present, by making it longer for more bits. To make it more clear, this way of representing bits is shown as a signal in FIG. 2.

The two previous ways of representing bits both have advantages and disadvantages.

The first way has a fixed length between the start of every bit, and a signal change at those locations. This makes it easier to detect bits, as the identification decoding method knows it has to find a signal change at regular intervals. It also can detect missed bits because of a too large distance between two successive bits. When a distance is too large, the identification decoding method can start looking for a signal change somewhere in the middle between the two bits.

The second way is the other way around. While it does have fixed lengths for every piece of line, it has no signal changes at regular intervals. Consequently, it is possible that the identification decoding method skips bits, because it has no idea when one bit ends and the other begins. It could, in other words, turn 4 ones into 3, without a good way to detect this error. On the other hand, the second way works with only two levels of thickness, in contrast to the first way with 3 levels.

Since the decoding is meant to be done on digital photographs captured by a digital imaging device, which can be blurry, partially shadowed, or, more generally, can be of bad quality, working with 3 levels possibly complicates the decoding of such digital photographs.

c) The third way represent bits combines the advantages of the first and second way. It works with only two levels, one representing a bit and the other the transition to the next bit. The combination of the 'bit' part and its transition are always the same length. Hence there is a signal change at regular intervals, for example when going from the transition to the following bit. The difference between a zero and a one is the length of the parts. For a one, the bit-part is significantly longer than for a zero. The transition-part of a bit is determined by the total length for a bit minus the length of the bit part. A signal for this kind of encoding is shown in FIG. 3.

Note that this third way of representing bits is classified as an unipolar line code.

While other ways of representing bits or N-bit data may be used, the third way has exactly the properties the identification decode method needs.

Error Correcting Codes

Although the third way in this example is chosen to allow easy decoding, it still remains possible that errors are made. Because of the regular signal changes, missed bits will be rare and can be corrected, but errors against bit values remain very possible, for example due to imperfections in the photograph. That's why a linear error-correcting code in this example is added to the encoding process by using a Hamming code, because of its ease of use and its error-correcting rather than error-detecting capabilities. More complex codes, such as the Hadamard code, may be used. In the example the Hamming(7,4)-code is used with an information rate of 57%, An extra advantage of Hamming(7, 4)-code is that most data consists of bytes, which are 8 bits, so the input data often consists of a multiple of four bits, which can be plugged directly into the Hamming(7,4)-code. This is, amongst others, the case for ASCII characters, which are each, a byte long, and after encoding them with the Hamming code are each 14 bits long. For example, the letter 'A' (capital a) is shown as encoded in a curve in FIG. 5. This letter is ASCII (American Standard Code for Information Interchange) character 65, and is represented as a byte as '0100 0001'. Using Hamming (7, 4)-code, this becomes: '1001100 1101001'. This is exactly what is illustrated in FIG. 5.

In coding theory, Hamming(7,4)-code, is a linear error-correcting code that encodes 4 bits of data into 7 bits by adding 3 parity bits. It is a member of a larger family of Hamming codes.

Enabling Data Decoding

In FIG. 5 the different bits could be read out from left to right, but this will not always be the case. The image seen in FIG. 5 might be printed out and hung up upside down or vertical. In order to be able to read and decode a curve, it must be possible to distinguish the end point of the curve from the start point of the curve. By adding a header and a tail to the plurality of N-bits, the read out of the plurality of N-bits can be done by evaluating the first and last bits. Note that both a header and a tail are necessary, because if only one is used, the data may be, by coincidence, the same as the header or tail. Furthermore, in order to decode a curve, one also needs to know what kind of information is inside the curve. This may be done by adding another 4-bit codeword to the curve, right after the header.

The encoding of a content (a string consisting of ASCII characters) in this example will go through the following steps:

1. The ASCII characters are converted to a plurality of 8-bit data. For example 'A' becomes '0100 0001';
2. The content is prefixed with a header sequence of 4 bits. For example '0100 0001' becomes '0001 0100 0001'
3. The corresponding tail sequence is added. ('0001' has four ones after encoding, so its tail is '0000'), for example '0001 0100 0001' becomes '0001 0100 0001 0000'
4. The whole is encoded with Hamming(7, 4)-code, for example '0001 0100 0001 0000' becomes '1101001 1001100 1101001 0000000'

The resulting codeword is drawn as on the curve in FIG. 6.

Example of an Identification Decoding Method

An example of a preferred embodiment is detailed as followed:

Pre-Processing a Photograph

In the example the photographs comes in RGB-formats. By different illumination conditions for the same curve, other colors, other resolutions, taken from under an angle, the input to the identification decoding method can be expected to be very diverse.

In a first stage the photograph (602) of a digital fingerprint code (DF code) by a digital imaging device is transformed to a binary image (612), using morphological operations. In the example an adaptive threshold method is used which introduced noise in places without curve. In order to prevent this noise from interfering with the following operations, a median blur is performed, to filter out the white spots (622). Because it might be possible that the median blur breaks the curves at bit transitions, the last step of the processing is to perform dilations (632) to connect all bits into one solid curve again. After these steps, it ends up with a binary image that can be used as input to more general algorithms, that don't need to be concerned about image details.

Finding the Skeleton of the Curve

In order to read out the content of the image captured curve from an image captured digital fingerprint code, one needs to follow the curve and at every point check the thickness of the curve at that point, since a computer cannot locate the bits easily like a human. Consequently, the next step in the example is finding the path that goes through the middle of the curve. It is quite clear that for the purposes of the application, the requirement of connectedness in the skeleton is far more important, because without connectedness, the content in the curve can not be found. It is found that the thinning algorithm of Zhang-Suen gives the best result as thinning method. It always delivers a completely connected curve, and thus gives a much more reliable and robust alternative to more straightforward methods.

Information about Line Thickness

Since the data is embedded using variable line thickness, there is a need for a method about the line thickness out of the pre-processed image, which is the result of the pre-processing of the photograph. An easy way to do this is by taking the euclidian distance transformation of the pre-processed image. This changes the value of every pixel to the distance of that pixel to the nearest black pixel. One can easily see on the pre-processed image that this value will, in the middle of the curve, approximate half of the thickness. After that, the curve is followed from start to end. At each location of the curve, the value of the distance transformation at that pixel location is stored. The collection of these values, in the order they are found, can be interpreted as a one-dimensional signal, varying with the location on the path. This signal corresponds to the noisy line thickness along the path, and it is this information that we need to get the embedded content. After reading out the values, they are smoothed by using a one-dimensional median filter in order to remove outliers and enhance interpretation.

Turning the Values into Bits

After obtaining the smoothed values, the method of decoding the image captured digital fingerprint code starts interpreting with the peaks in the one-dimensional signal as bits. In the example it is done in two steps:
a) The peak positions are searched.
b) decodes to a plurality of N-bit data, which is binary data, by checking length and width of the peaks If the plurality of N-bit data is decoded from the image captured curve, the plurality of N-bit data is converted to the content which is embedded in the curve of the digital fingerprint code.

Other Preferred Embodiments

The present invention may comprise thus a two dimensional shape recognition method, to determine the shape of the digital fingerprint code but also if a change is found in the determined one-dimensional signal, the identification decoder may check the shape that forms the thickness on the location. This may introduce an extra facility to embed extra N-bit data and security in the digital finger print code. The identification encoder may therefore select from a number of shapes to change with the selected shape the thickness of a part in the first segment to the determined thickness. A preferred two dimensional shape recognition method is the SKS algorithm as disclosed in "A Shape Recognition Algorithm Robust to Occlusion: Analysis and Performance Comparison" by Karthik Krish and Wesley Snyder, Sep. 13, 2007. But also other two dimensional shape recognition methods may be used such as shape context method, Hu Moments method and curvature scale space matching method.

The thicknesses that form the embedded code on a curve in a digital finger print may comprise itself an identification code such as a QR-code, a bar-code or digital finger print code.

The determined image captured curve may be formed by a high contrast in the image so the determination step for the image captured curve may comprise a contrast change method to determine a curve in the image captured digital fingerprint code.

The determined curve in the document of the identification encoding method is preferable generated by a plane filling line pattern generator so the determined curve is a plane filling line pattern and more preferable it is generated by an Lindenmayer system.

Plane Filling Line Pattern

To prevent counterfeiting, geometric repeat patterns are filled in a region, mostly filled as background pattern, of the document space from a document. The complexity of such geometric repeat patterns is hard to reproduce and thus serve as a security feature. Such geometric repeat patterns which are filling a region are called a plane filling line pattern.

A plane filling line pattern, which is determined by one or more lines, is a geometric repeat pattern that may fill a region, also called a space, in the document space of a document. This region can be any shape but it is totally filled with the plane filling line pattern. Preferably this region is rectangular shaped. The lines or parts of lines, in a plane filling line patterns may have any colour, thickness or may be defined as a dashed line. Preferably a plane filling line patterns is a single line which fills the region.

In a preferred embodiment of the present invention the plane filling line patterns is a space-filling curve or a FASS curve, a space-filling curve, a self-similar fractal curve, a de Rham curve, a space-filing tree, a maze, a fret pattern, a kolam pattern, interlace pattern, or a labyrinth. In the present invention the plane filling line patterns (105) has the constraint to comprise a repeating sub-pattern that defines a line, bounded by two distinct end points and preferably the plane filling line pattern, itself, is a line, bounded by two distinct end points.

Interlace patterns are a kind of design, historically used as a decorations in many places and by different cultures, such as everlasting knots, Celtic knots or Islamic interlace pattern or Croatian interlace patterns. Interlace patterns are mostly looped, braided and/or knotted.

In the state-of-the-art a plane filling line patterns is generated by a plane filling line pattern generator wherein these geometric repeat pattern, also called a periodic pattern, are generated by software methods which often comprises mathematical methods. In a preferred embodiment the plane filling line pattern generator is a Lindenmayer-system.

In the present invention the plane filling line patterns is generated and determined as a plurality of draw instructions. A draw instruction is an instruction to draw an image in a document space. The image is often a geometrical primitive such as a point, line, arc, polygon. A draw instruction may be a vector draw instruction or a straight line draw instruction. The generated plurality of draw instructions may comprise also other instructions such as jump to absolute or relative positions in the document space, storing positions, direction of drawing, defined as an angle . . . .

Some examples of computer generated geometric repeat patterns are Taprats™ (http://sourceforge.net/projects/taprats) for Islamic interlacing pattern, Knotter™ (http://sourceforge.net/projects/knotter) for Celtic Knots, Amaze™ (http://sourceforge.net/projects/qtamaze) for maze generation. A Kolam pattern generator is disclosed in ROBINSON THAMBURAJ. Extended Pasting Scheme for Kolam Pattern Generation. FORMA. 2007, vol. 22, p. 55-64.

The generated plane filling line pattern after the overlaying may be clipped and/or scaled to a determined region from the document space of the security document. The determined region may be any shape.

The lines in a plane filling line patterns and the lines in the determined graphic object (205, 207) in the present invention have preferably a thickness between 1 μm and 10 mm. Smaller the thickness of these lines more difficult to counterfeit the security document.

The minimum distances between the lines in a plane filling line patterns is preferably between 1 μm and 10 mm. Smaller the minimum distances between the lines, more difficult to counterfeit the document.

The spaces between the lines in a plane filling line patterns (105) and the lines in the determined graphic object in the present invention are preferably between 1 μm and 10 mm. Smaller the spaces between the lines, more difficult to counterfeit the document.

Lindenmayer System

A Lindenmayer system, also called an L-system, is a parallel rewriting system and a type of formal grammar. An L-system consists of an alphabet of symbols that can be used to make strings, a collection of production rules that expand each symbol into some larger string of symbols, an initial "axiom" string from which to begin construction, and a mechanism for translating the generated strings into geometric structures. The symbols of the alphabet are preferably vector draw instructions, such as Turtle Graphics and the string generated from the Lindenmayer system is than a plurality of step-by-step vector draw instructions.

L-systems are disclosed in an electronic version of a book, especially in Chapter 1, that was published by Springer-Verlag, New York, in 1990 an reprinted in 1996: *"The Algorithmic Beauty of Plants"* by Przemyslaw Prusinkiewicz, Aristid Lindenmayer.

A pattern generated by an L-system is an advantage to be used as security enabled graphic object in a security document to prevent for example counterfeiting. Because the security pattern is defined by determined production rules and determined alphabet, which are difficult to re-engineer on the security pattern itself.

The recursive nature of the L-system rules leads to self-similarity and thereby, fractal-like forms are easy to describe with an L-system, such as a Hilbert curve or Sierpinski Triangle.

In a preferred embodiment the L-system generates a space-filling curve. Space filling curves are disclosed in is BADER MICHAEL. Space-Filling Curves: An Introduction With Applications in Scientific Computing. Edited by BARTH T. J., et al. SPRINGER, 2012. p. 278. In a preferred embodiment the L-system generates a space filling curve selected from Hilbert curve, Levy C curve, Koch curve, Peano curve, Gosper curve, Dragon curve, Moore curve.

REFERENCE SIGNS LIST

TABLE 1

| | |
|---|---|
| 100 | Vertical axis |
| 200 | Horizontal axis |
| 300 | A plurality of binary data |
| 500 | Digital fingerprint code |
| 406 | Value '1' |
| 405 | Value '0' |
| 400 | Curve |
| 602 | Image capturing method |
| 605 | An image captured digital fingerprint code |
| 612 | Thresholding method |
| 615 | An threshold image captured digital fingerprint code |
| 622 | Blurring method |
| 625 | A blurred thresholded image captured digital fingerprint code |
| 632 | Dilatation method |
| 635 | A dilatational blurred thresholded image captured digital fingerprint code |
| 900 | User interface object |
| 901 | User interface object |
| 902 | User interface object |
| 903 | User interface object |
| 904 | User interface object |
| 905 | User interface object |
| 906 | User interface object |
| 907 | User interface object |
| 908 | User interface object |
| 909 | User interface object |
| 910 | User interface |

What is claimed is:

1. A decorative workpiece comprising:
a wood pattern including an inkjet printed identification code to track-and-trace the decorative workpiece; wherein
the inkjet printed identification code is embedded in nerves in the wood pattern;
the inkjet printed identification code includes a plurality of N-bit data that represent content;
the plurality of N-bit data includes first N-bit data (N1) and a different second N-bit data (N2) on one of the nerves; and
a thickness (TN,i,1) of a value (vN,1) from the first N-bit data (N1) on the nerve is different from a thickness (TN,i,2) of a value (vN,2) from the second N-bit data (N2), and/or a length (LN,i,1) of the value (vN,1) from the first N-bit data (N1) on the nerve is different from a length (LN,i,2) of the value (vN,2) from the second N-bit data (N2).

2. The decorative workpiece according to claim 1, wherein the decorative workpiece is selected from the group consisting of kitchen panels, flooring panels, furniture panels, ceiling panels, and wall panels.

3. The decorative workpiece according to claim 2, wherein the decorative workpiece includes a glueless tongue and groove joint.

4. A decorative workpiece comprising:
a wood pattern including an inkjet printed identification code to track-and-trace the decorative workpiece; wherein
the inkjet printed identification code is embedded in nerves in the wood pattern;
the inkjet printed identification code includes a plurality of N-bit data that represent content; and
the wood pattern is inkjet printed on a paper substrate to be impregnated with a thermosetting resin and heat-pressed on a core layer.

5. The decorative workpiece according to claim 4, wherein the wood pattern includes one or more aqueous inkjet inks on the paper substrate.

6. The decorative workpiece according to claim 5, wherein the thermosetting resin includes a melamine based resin.

7. The decorative workpiece according to claim 6, wherein the core layer includes wood based material selected from the group consisting Medium Density Fibreboard, High Density Fibreboard, and Oriented Strand Board.

* * * * *